United States Patent [19]
Nunnally et al.

[11] Patent Number: 6,016,230
[45] Date of Patent: Jan. 18, 2000

[54] OPTICAL MOUNT WITH A LOCKING ADJUSTMENT SCREW

[75] Inventors: M. A. Nunnally, Mission Viejo; Paul F. Secrist, Laguna Niguel, both of Calif.

[73] Assignee: Newport Corporation, Irvine, Calif.

[21] Appl. No.: 09/038,469

[22] Filed: Mar. 11, 1998

[51] Int. Cl.[7] .................................................. G02B 7/02
[52] U.S. Cl. ........................................ 359/819; 359/822
[58] Field of Search .................................. 359/819, 822, 359/830

[56] References Cited

U.S. PATENT DOCUMENTS

| | | | |
|---|---|---|---|
| 1,143,165 | 6/1915 | Begush | 33/818 |
| 1,306,906 | 6/1919 | Jaques, Sr. | 33/817 |
| 3,620,558 | 11/1971 | MacMillan | 403/290 |
| 3,667,525 | 6/1972 | Spieth | 411/292 |
| 4,316,678 | 2/1982 | F'Geppert | 403/259 |
| 4,657,429 | 4/1987 | Morris | 403/362 |
| 4,914,867 | 4/1990 | Saito et al. | 451/292 |
| 4,966,474 | 10/1990 | Geiger | 384/517 |
| 5,140,470 | 8/1992 | Kuecke | 359/818 |
| 5,757,561 | 5/1998 | Secrist et al. | 359/822 |

*Primary Examiner*—Georgia Epps
*Assistant Examiner*—Suzanne Letenare
*Attorney, Agent, or Firm*—Blakely Sokoloff Taylor & Zafman

[57] ABSTRACT

An optical mount which has a locking fastener. The optical mount may include a first plate and a second plate. The first plate may capture an optical device such as a lens or a mirror. A collet may be attached to the second plate. A first drive screw may extend through a threaded bore of the collet and engage the first plate. Rotation of the drive screw in one direction can move the first plate away from the second plate. The mount may further have a spring which pulls the first plate back toward the second plate when the drive screw is rotated in a second opposite direction. The collet may have a slit that separates a collet flange from a collet base. The locking fastener can be actuated to push the collet flange away from the collet base and to lock the first fastener to the collet. Actuation of the locking fastener does not create a corresponding shift between the threads of the fastener and the threads of the collet.

22 Claims, 4 Drawing Sheets

OPTICAL MOUNT WITH A LOCKING ADJUSTMENT SCREW

BACKGROUND OF THE INVENTION

1. FIELD OF THE INVENTION

The present invention relates to a locking mechanism for locking a drive screw of a mount assembly.

2. BACKGROUND INFORMATION

Optical devices such as lenses and mirrors are typically coupled to a mechanical assembly by a mount. FIG. 1 shows a mount which includes a first plate 1 that is coupled to a second plate 2 by a spring 3 and threaded drive screws 4. The first plate 1 may capture an optical device 5 such as a lens or a mirror. It may be desirable to move the optical device 5 even after it has been assembled to the mount. Rotation of a drive screw 4 in one direction may cause the first plate 1 and optical device 5 to move away or rotate about the second plate 2. A counter-rotation of the drive screw 4 may allow the spring 3 to pull the first plate 1 back toward the second plate.

It may desirable to incorporate a locking mechanism which locks one or more of the drive screws 4 and fixes the position of the optical device 5. Engagement of the locking mechanism should minimize movement of the optical device. Such a mechanism would increase the stability of the mount.

FIG. 2a shows the engagement of the threads 6 of the drive screw 4 with the threads 7 of the second plate 2. The spring 3 may exert a force which causes the threads 6 of the drive screw 4 to engage a first surface 8 of the plate threads 7.

As shown in FIG. 2b a locking mechanism may move the threads 6 into engagement with a second surface 9 of the plate threads 7. The shifting of the threads 6 from the first surface 8 to the second surface 9 will cause a corresponding movement of the first plate 1 and the optical device 5. Although the actual displacement of the threads 6 is relatively small, even a small movement of the optical device 5 may create an error or failure in the overall system. It would therefore be desirable to provide a locking mechanism for a drive screw which does not cause a shift in the drive screw threads.

SUMMARY OF THE INVENTION

One embodiment of the present invention is an optical mount which has a locking fastener. The optical mount may include a first plate and a second plate. A collet may be attached to the second plate. A first drive screw may extend through the collet and engage the first plate. The collet may have a slit that separates a collet flange from a collet base. The locking fastener can be actuated to push the collet flange away from the collet base to lock the first drive screw to the collet.

DETAILED DESCRIPTION OF THE INVENTION

One embodiment of the present invention is an optical mount which has a locking fastener. The optical mount may include a first plate and a second plate. The first plate may capture an optical device such as a lens or a mirror. A threaded collet may be attached to the second plate. A first drive screw may extend through a threaded bore of the collet and engage the first plate. Rotation of the drive screw in one direction can move the first plate away from the second plate. The mount may further have a spring which pulls the first plate back toward the second plate when the drive screw is rotated in a second opposite direction. The collet may have a slit that separates a collet flange from a collet base. The locking fastener can be actuated to push the collet flange away from the collet base and to lock the first drive screw to the collet. Actuation of the locking fastener does not create a corresponding shift between the threads of the fastener and the threads of the collet. Since the shift is in the same direction as the spring force.

Figure 1:
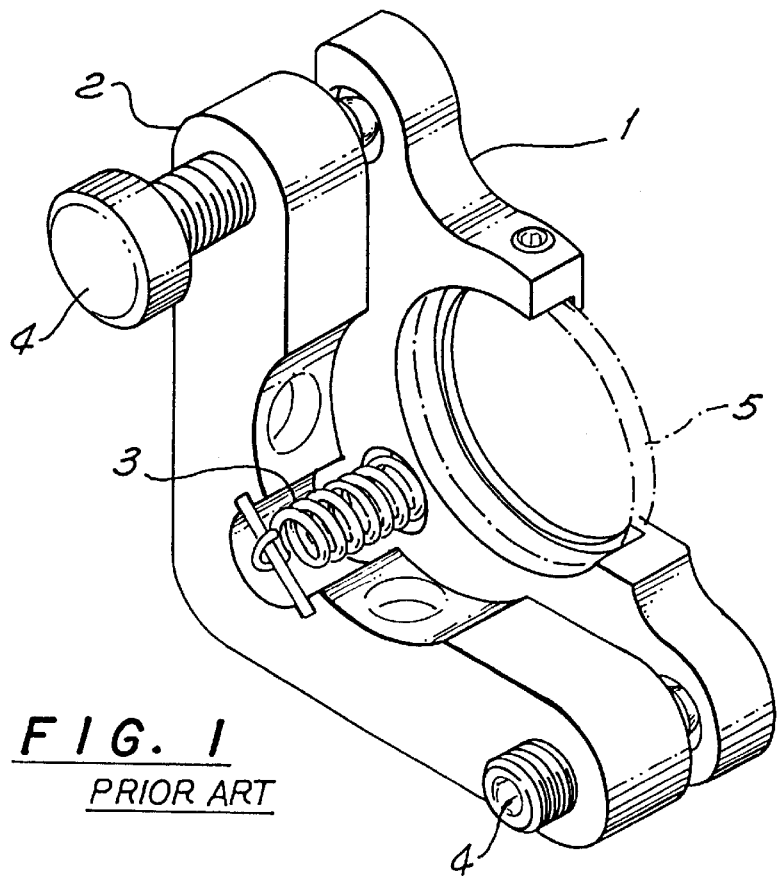
FIG. 1 is a perspective view of a mechanical mount of the prior art.
Figure 2A:
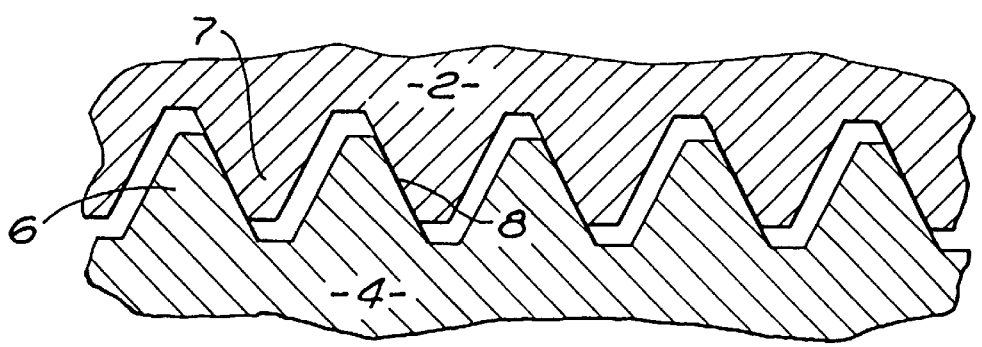
FIG. 2a is a cross-sectional view of the mechanical mount of FIG. 1 showing engaging threads of the mount.
Figure 2B:
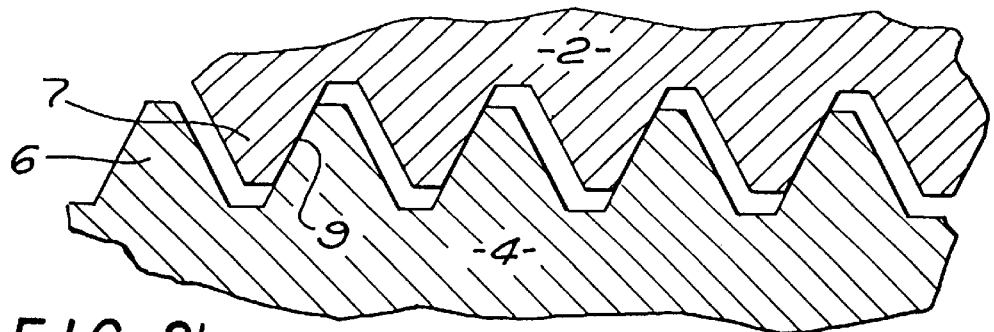
FIG. 2b is a cross-sectional view similar to FIG. 2a showing a shift in the position of the threads.
Figure 3:
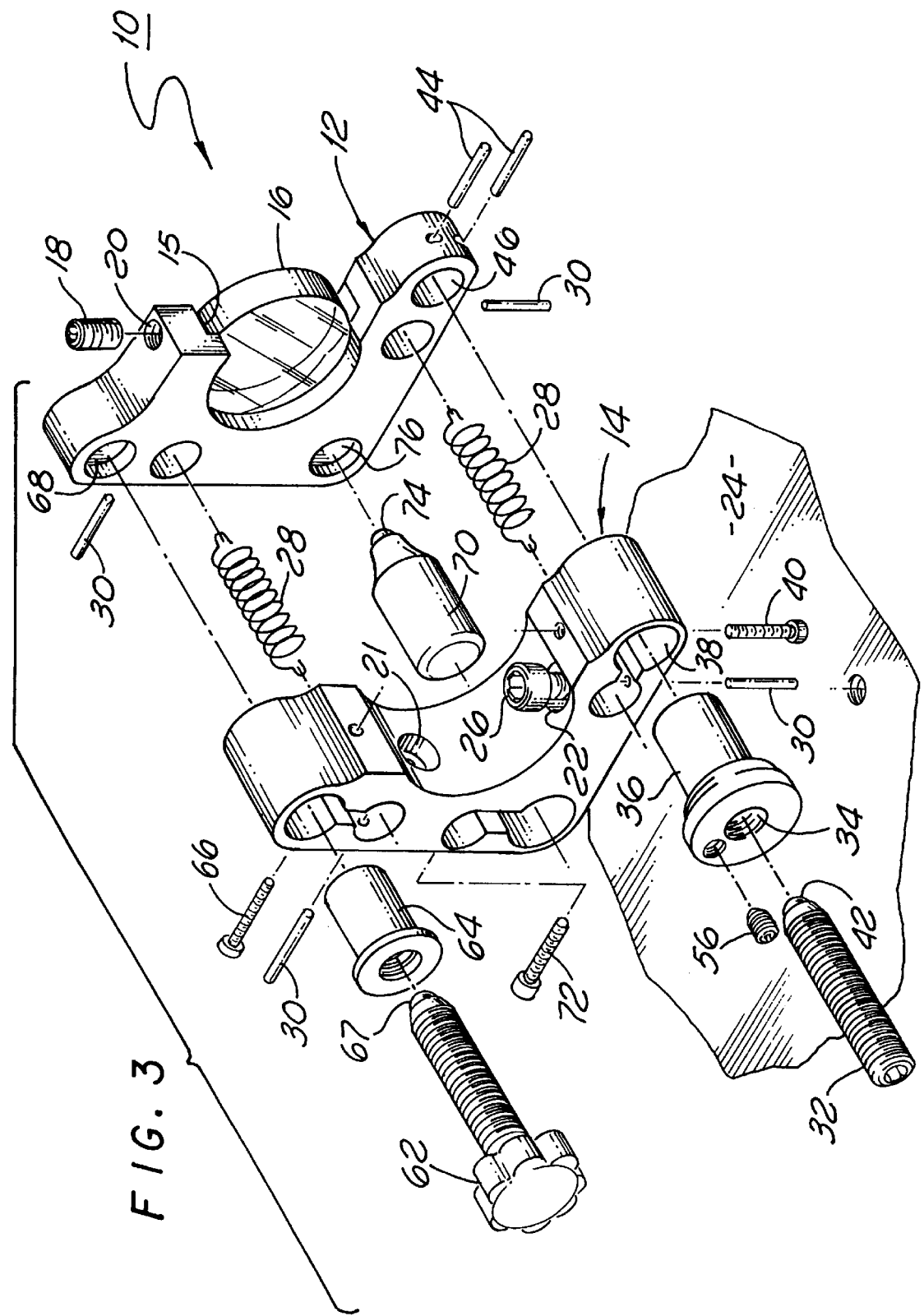
FIG. 3 is an exploded view of an embodiment of a mechanical mount of the present invention.
Figure 4:
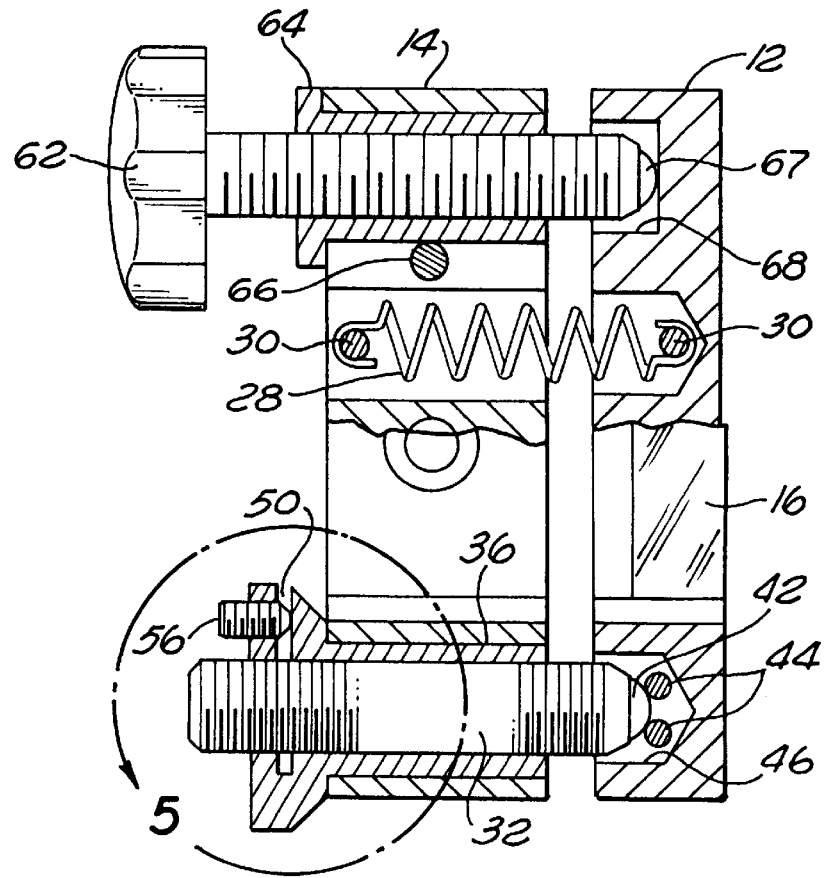
FIG. 4 is a cross-sectional view of the mechanical mount.

Referring to the drawings more particularly by reference numbers, FIGS. 3 and 4 show an embodiment of a mechanical mount 10 of the present invention. The mount 10 may include a first plate 12 and a second plate 14. The first plate 12 may include a cavity 15 that receives the outer rim of an optic 16 such as a lens. The optic 16 may be held in place by a fastener 18 which is screwed into a threaded aperture 20 of the plate 12. Although a lens is shown, it is to be understood that the mount 10 may capture a different component such as a mirror or another optical device. Additionally, although mount plates 12 and 14 are shown and described, the present invention may be implemented to lock a fastener which couples any object to another object.

The second plate 14 may include a pair of holes 21 and 22 which allow the mount 10 to be attached to a base 24 by a fastener 26 such as a set screw. The base 24 may be the top surface of an optical bench. The mount 10 may include a pair of springs 28 which bias the first plate 12 toward the second plate 14. The ends of the springs 28 may be attached to pins 30 which are pressed into the first 12 and second 14 plates.

The mount 10 may include a first threaded drive screw 32 which can be rotated to move the first plate 12 relative to the second plate 14. The threaded drive screw 32 extends through a threaded bore 34 of a collet 36. The collet 36 extends through a bore 38 of the second plate 14. The fastener collet 36 is held in place and prevented from rotating by a screw 40 that can be tightened to clamp the collet 36 to the second plate 14.

As shown in FIG. 4, the drive screw 32 may have a tip 42 that engages a pair of pins 44 that are pressed into a bore 46 of the first plate 12. The tip 42 pushes the first plate 12 away from the second plate 14 when the drive screw 32 is rotated in a first direction. The springs 28 pull the first plate 12 back toward the second plate 14 when the drive screw 32 is rotated in an opposite second direction. The movement of the first plate 12 may cause a corresponding pivotal movement of the optic 16.

Figure 5:
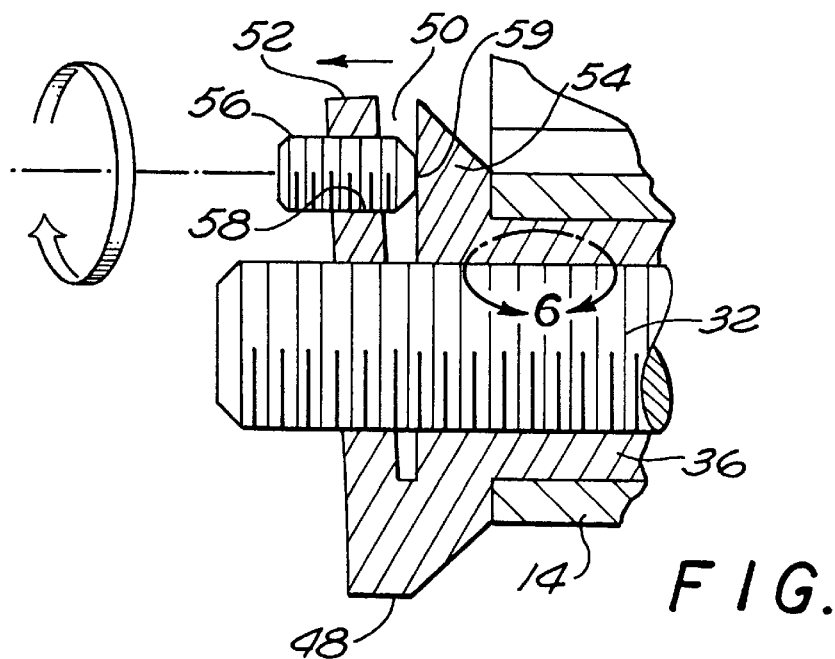
FIG. 5 is an enlarged cross-sectional view of a locking mechanism of a drive screw of the mount.

As shown in FIG. 5, the collet 36 may have a collar 48 which has a slit 50 that extends to the bore 34. The slit 50 may separate a collar flange 52 from a collar base 54. In one embodiment, the slit 50 may extend at least 180° about the collet 36. A locking fastener 56 may be screwed into the collar 48 in a direction that is essentially perpendicular to the slit 50. The locking fastener 56 may be a set screw that is screwed into a corresponding threaded aperture 58 of the collar 48. A tip 59 of the fastener 56 may engage the collar base 54.

Figure 6:
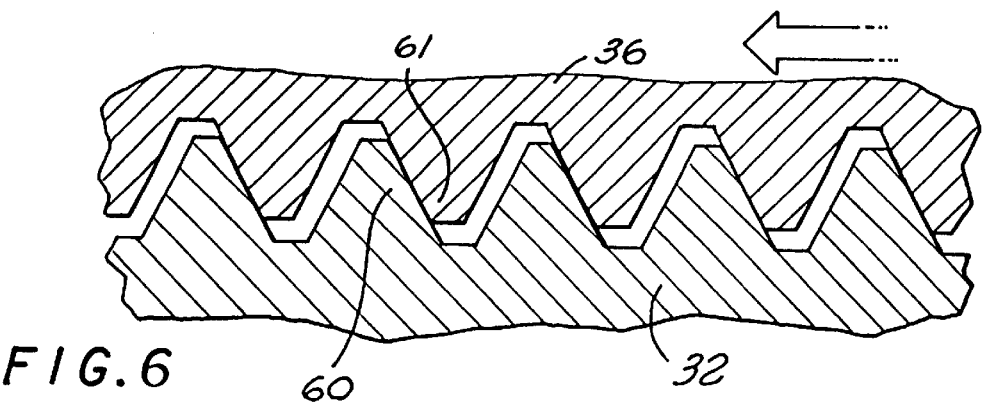
FIG. 6 is an enlarged cross-sectional view showing a pair of engaging threads of the mount.

Rotation of the locking fastener 56 in one direction may deflect the collar flange 52 away from the collar base 54. The flange deflection may create a locking force which prevents rotation between the fastener 56 and the collet 36. As shown in FIG. 6, the locking force may be in the same direction as the spring force so that there is no relative movement between the threads 60 of the first threaded fastener 32 and the threads 61 of the collet 36 when the fastener 32 is locked in place. The present invention thus provides a locking mechanism which does not induce relative movement between the threads 60 and 61 when the mechanism is engaged. The lack of thread movement increases the stability of the mount 10.

Referring to FIGS. 3 and 4, the mount 10 may include a second threaded drive screw 62 that extends through the second plate 14 and engages the first plate 12. The second threaded drive screw 62 may be screwed into the threaded bore (not shown) of another collet 64. The fastener collet 64 may be held in place by a set screw 66 that clamps the collet 64 to the second plate 14. A tip 67 of the drive screw 62 may extend into a counterbore 68 of the first plate 12.

Rotation of the second threaded drive screw 62 in one direction may move the first plate 12 away from the second plate 14. Rotation of the drive screw 62 in a second opposite direction may allow the springs 28 to move the first plate 12 back toward the second plate 14. The movement of the first plate 12 may cause a corresponding pivotal movement of the optic 16.

The mount 10 may further have a pivot pin 70 that is clamped to the second plate 14 by a set screw 72. The pin 70 may have a tip 74 that engages the first plate 12 within a counterbore 76 of the plate 12. The Rotation of the first 32 and/or second 62 drive screw causes the first plate 12 and lens 16 to pivot about the pin 70.

Figure 7:
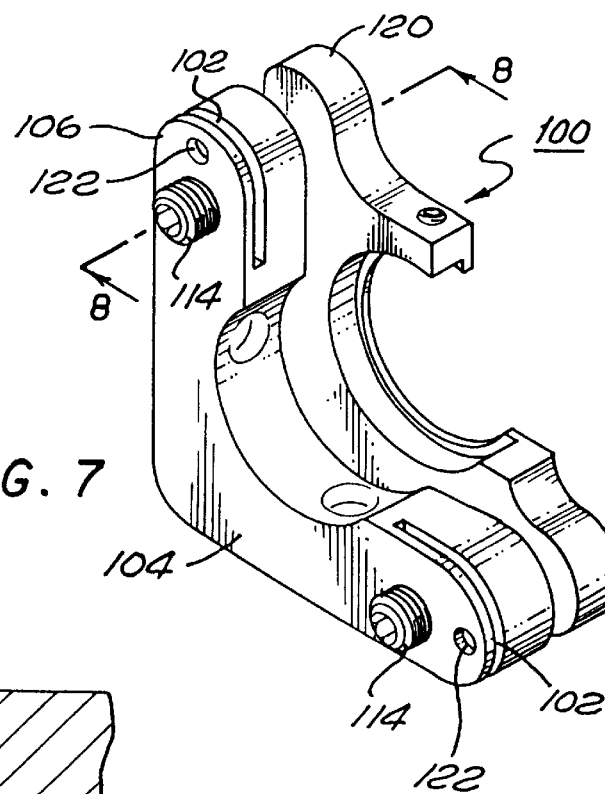
FIG. 7 is a perspective view of an alternate embodiment of the mount.
Figure 8:
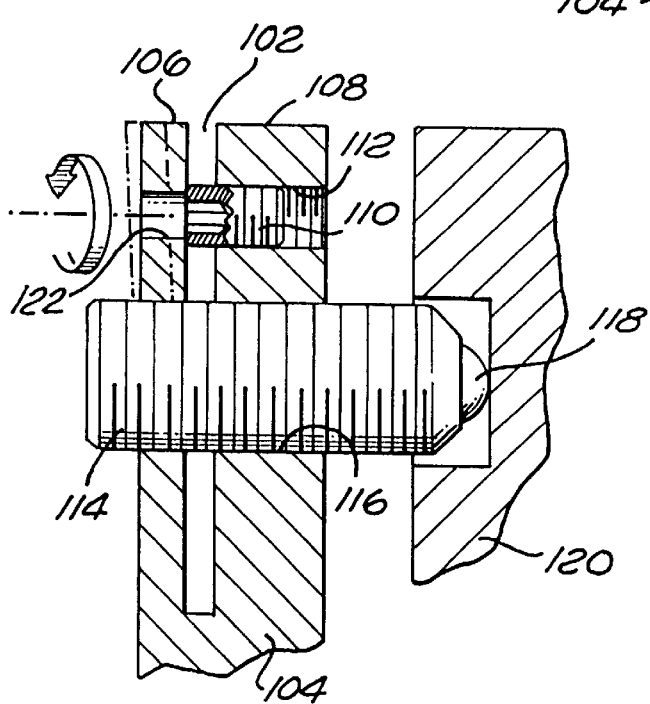
FIG. 8 is a cross-sectional view showing a locking mechanism of the mount shown in FIG. 7.

FIGS. 7 and 8 show an alternate embodiment of a mount 100 which has a pair of slits 102 formed in a second plate 104. Each slit 102 may separate a plate flange 106 from a plate base 108. A pair of locking fasteners 110 may be screwed into corresponding threaded apertures 112 of the plate base 108.

A pair of first threaded drive screws 114 may be screwed into corresponding threaded bore 116 of the second plate 104. A tip 118 of each fastener 114 may engage a first plate 120. Rotation of a drive screw 114 may cause the first plate 120 to move toward or away from the second plate 104. The mount 100 may have a spring (not shown) which biases the first plate 120 toward the second plate 104.

The plate flange 106 may have a pair of clearance holes 122 which allow for the insertion of a tool (not shown) to rotate the locking fasteners 114. The inner diameter of the locking fasteners 110 may be greater than the diameter of the holes 122 so that rotation of a fastener 110 may move the plate flange 106 away from the plate base 108. Pushing the plate flange 106 creates a locking force that prevents relative movement between the drive screw 114 and the second plate 104. The locking force may be in a direction which prevents relative movement between the threads of the drive screw 114 and the plate 104.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Although a mount which can provide pivotal movement of an optical component is shown and described, it is to be understood that the locking mechanism can be used for other devices. For example, the mount may provide translational movement of the optic or other device captured by the first plate.

Additionally, the outer diameter of the collet 36 shown in FIGS. 3–6 may have a standard size so that the collet/fastener subassembly can be installed in a variety of different devices. For example, the collet may be inserted into a machine tool, wherein the drive screw 32 is used to tighten another component into the tool. The locking fastener 56 can then be used to lock the drive screw 32.

What is claimed is:

1. An optical mount, comprising:
   a first plate;
   a second plate;
   a collet that is attached to said second plate, said collet having a slit that separates a collet flange from a collet base, said collet having a threaded portion;
   a first drive screw that has a longitudinal axis, a threaded portion and extends through said collet and engages said first plate; and,
   a locking fastener that pushes said collet flange away from said collet base to press at least a portion of said threaded portion of said collet into said threaded portion of said first drive screw along the longitudinal axis of said first drive screw.

2. The mount as recited in claim 1, wherein said locking fastener has a tip that engages said collet base.

3. The mount as recited in claim 1, wherein said locking fastener is a set screw that is screwed into a corresponding threaded aperture of said collet flange.

4. The mount as recited in claim 1, wherein said slit extends at least 180° about said collet.

5. The mount as recited in claim 1, further comprising a spring that biases said first plate toward said second plate.

6. The mount as recited in claim 5, wherein said locking fastener exerts a locking force on said collet flange that is in the same direction as a spring force exerted by said spring.

7. The mount as recited in claim 1, further comprising a second drive screw that extends from said second plate and engages said first plate.

8. The mount as recited in claim 1, further comprising a pivot pin that extends from said second plate and engages said first plate.

9. An optical mount, comprising:
   a first plate;
   a second plate which has a threaded bore, said second plate further having a slit that separates a second plate flange from a second plate base;
   a first drive screw that has a longitudinal axis and extends through said threaded bore of said second plate and engages said first plate, said first drive screw having a threaded portion; and, a locking fastener that pushes said second plate flange away from said second plate base to press at least a portion of said threaded bore into said threaded portion of said first drive screw along the longitudinal axis of said first drive screw.

10. The mount as recited in claim 9, wherein said locking fastener has a tip that engages said second plate base.

11. The mount as recited in claim 9, wherein said locking fastener is a set screw that is screwed into a corresponding threaded aperture of said second plate base.

12. The mount as recited in claim 9, further comprising a spring that biases said first plate toward said second plate.

13. The mount as recited in claim 12, wherein said locking fastener exerts a locking force on said second plate flange that is in the same direction as a spring force exerted by said spring.

14. The mount as recited in claim 9, wherein said first drive screw has a thread that engages a first surface of a thread of said threaded bore and said locking fastener exerts a force which tightens said engagement of said first drive screw thread and said first surface of said collet thread.

15. An optical mount, comprising:

a first plate;

a second plate;

a collet that is attached to said second plate, said collet having a threaded bore which has a thread that has a first surface;

a first drive screw that has a longitudinal axis and extends through said threaded bore of said collet and which engages said first plate, said first drive screw having a thread that engages said first surface of said collet thread; and, a locking fastener that exerts a locking force which tightens said engagement of said first drive screw thread and said first surface of said collet thread along the longitudinal axis of said first drive screw.

16. The mount as recited in claim 15, wherein said collet includes a slit that separates a collet flange from a collet base.

17. The mount as recited in claim 16, wherein said locking fastener has a tip that engages said collet base.

18. The mount as recited in claim 16, wherein said locking fastener is a set screw that is screwed into a corresponding threaded aperture of said collet flange.

19. The mount as recited in claim 18, wherein said slit extends at least 180° about said collet.

20. The mount as recited in claim 19, further comprising a spring that biases said first plate toward said second plate.

21. The mount as recited in claim 20, further comprising a second drive screw that extends from said second plate and engages said first plate.

22. The mount as recited in claim 21, further comprising a pivot pin that extends from said second plate and engages said first plate.

* * * * *